United States Patent [19]
Ando et al.

[11] Patent Number: 4,735,926
[45] Date of Patent: Apr. 5, 1988

[54] ALUMINA CERAMIC BODY

[75] Inventors: Minato Ando, Aichi; Masaaki Ito; Fumio Mizuno, both of Nagoya, all of Japan

[73] Assignee: NGK Spark Plug Co., Ltd., Nagoya, Japan

[21] Appl. No.: 839,579

[22] Filed: Mar. 14, 1986

[30] Foreign Application Priority Data

Mar. 15, 1985 [JP] Japan .................. 60-52852

[51] Int. Cl.$^4$ ............................. C04B 35/46
[52] U.S. Cl. .................. 501/127; 501/136; 501/153
[58] Field of Search ............ 501/127, 134, 135, 153, 501/136, 132

[56] References Cited

U.S. PATENT DOCUMENTS 4,591,574 5/1986 Ando et al. ............ 501/136 OR
4,614,725 9/1986 Ando et al. ............ 501/136 OR

FOREIGN PATENT DOCUMENTS 0149802 7/1981 Fed. Rep. of Germany ...... 501/153
0176967 9/1985 Japan .................. 501/153
0781190 11/1980 U.S.S.R. .................. 501/153

Primary Examiner—Mark L. Bell
Assistant Examiner—Karl Group
Attorney, Agent, or Firm—Wegner & Bretschneider

[57] ABSTRACT

A dielectric alumina ceramic body having a constant dielectric loss tangent tan δ is obtained by sintering a composition consisting essentially of:

100 parts by weight of a ternary formulation consisting of 92.4 to 98.7 mol % $Al_2O_3$, at least 0.5 mol % CaO, and 1.3 to 7.6 mol % $TiO_2$; and at least one selected from the group consisting of $Cr_2O_3$ and NiO subject to the relation of:

$$76 \leq \frac{50}{3} x + 40y + \frac{265}{18} (z - 90) \leq 136$$

where x is the weight part of $Cr_2O_3$ per 100 parts by weight of said formulation,
y is the weight part of NiO per 100 parts by weight of said formulation, and
z is the mol % of $Al_2O_3$ in the formulation,
provided that x≧0 and y≧0, except x=y=0.

6 Claims, 1 Drawing Sheet

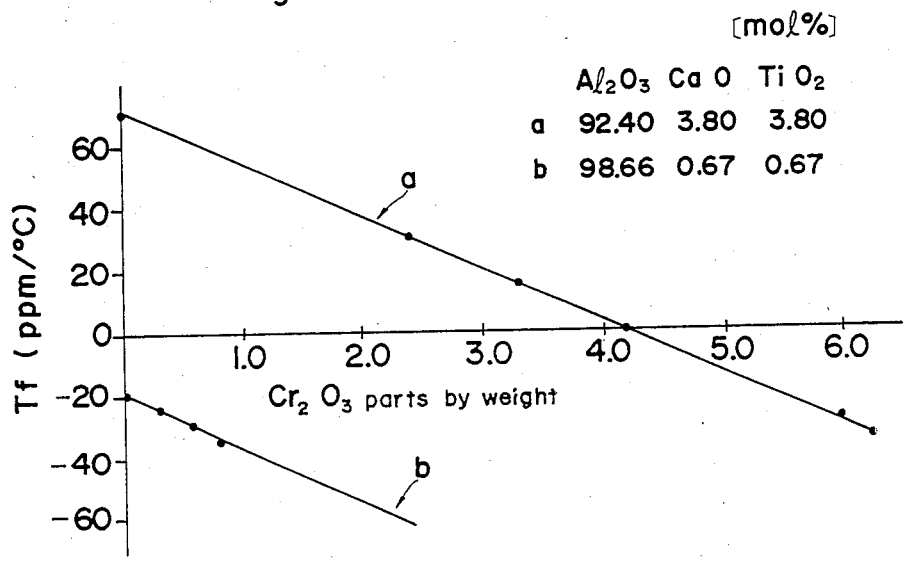
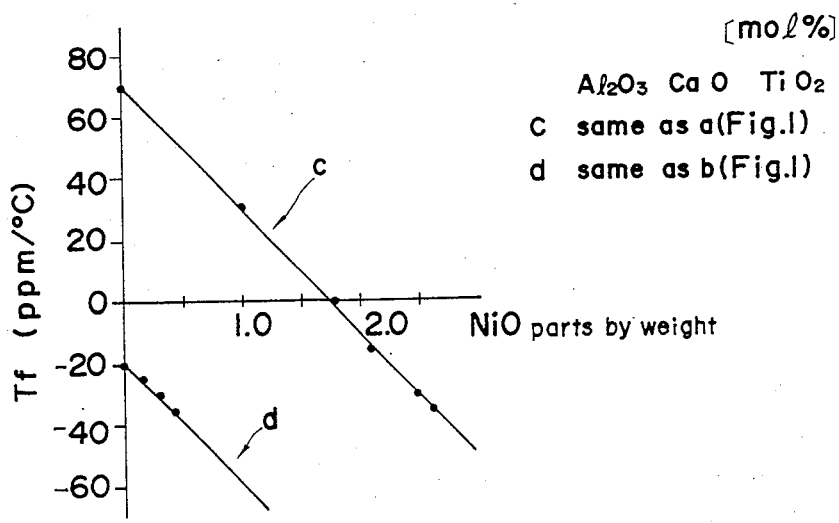

ALUMINA CERAMIC BODY

FIELD OF THE INVENTION

The present invention relates to alumina ceramics, particularly porcelain, which are best-suited for application to the fields where dielectric ceramic articles having reduced or limited high-frequency dielectric loss are demanded as the parts of communications equipment such as dielectric oscillators, microwave integrated circuit boards, microwave transmitting apertures, dielectric resonators and dielectric elements for antennas.

BACKGROUND OF THE INVENTION

With recent developments of communications networks, the frequency bands applied are now extended even to the microwave band. In this connection, dielectric ceramics are now applied to dielectric oscillators, microwave integrated circuit boards or impedance matching of various microwave circuits, etc.

Such dielectric ceramic articles are required to have a dielectric constant (hereinafter designated as E) of 10 or thereabout, and to be low in both the absolute values of a dielectric loss tangent (hereinafter designated as tan $\delta$) and a temperature coefficient of resonance frequency (hereinafter designated as Tf). On the other hand, alumina ceramics are expected to become such dielectric ceramics as mentioned above, since it has an E of about 10 and a low tan $\delta$, and its raw material occurs abundantly. However, it has not yet been put to any practical use due to the fact that the absolute value of Tf is high, as expressed in absolute terms of about −60 ppm/°C. To solve this, it has been proposed to add MgO, $TiO_2$ and CaO to alumina in a certain porportion (Japanese Patent Kokai-Publication No. 53-149696). In Japanese Patent Application No. 59-32113 specification (now JP Patent Kokai-Publication No. 60-176967), the present inventors have also proposed an alumina ceramic composition comprising $Al_2O_3$, CaO and $TiO_2$ for the same purpose.

The conventional compositions are unsuitable for the purpose of obtaining articles having a substantially constant tan $\delta$ but varied Tf values, since there is a large tan $\delta$ variation depending upon a very slight change in the amount of additives, even though an article having a desired Tf value is obtained.

SUMMARY OF THE INVENTION

It is therefore an object of the present invention to provide a solution to the aforesaid problem and thereby provide an alumina ceramic body having a substantially constant tan $\delta$ but various Tf values.

More specifically, for application to high-frequency dielectric ceramic articles, the present invention provides an alumina ceramic body obtained by sintering a composition consisting essentially of:

100 parts by weight of a ternary formulation consisting of 92.4 to 98.7 mol % $Al_2O_3$, and 1.3 to 7.6 mol % in total of CaO and $TiO_2$, provided that the CaO is at least 0.5 mol %; and at least one selected from the group consisting of $Cr_2O_3$ and NiO subject to the relation of:

$$76 \leq \frac{50}{3}x + 40y + \frac{265}{18}(z - 90) \leq 136$$

where x is the weight part of $Cr_2O_3$ per 100 parts by weight of said formulation, y is the weight part of NiO per 100 parts by weight of said formulation, and z is the mol % of $Al_2O_3$ in the formulation,
provided that $x \geq 0$ and $y \geq 0$, except $x = y = 0$.

The high frequency dielectric alumina ceramic body according to the present invention includes high frequency dielectric elements for use in dielectric oscillators, microwave integrated circuit boards, microwave transmitting windows, dielectric resonators, dielectric elements for antennas and the like elements for which the high frequency dielectric characteristics are essential. Thus the term "alumina ceramic body" is almost equivalent to dielectric alumina ceramic elements.

BRIEF DESCRIPTION OF THE DRAWINGS

FIGS. 1 and 2 are graphs showing the relation of Tf versus the amount of $Cr_2O_3$ and NiO, respectively, according to the embodiments of the present invention; and FIG. 3 is a graph showing the relation of P versus the value of (z-90) mol % according to other embodiments of the present invention.

PREFERRED EMBODIMENTS OF THE INVENTION

An E value of about 10 and a tan $\delta$ value of $2 \times 10^{-4}$ or lower are obtained by making the content of $Al_2O_3$ in the $Al_2O_3$-CaO-$TiO_2$ system at least 92.4 mol %. The presence of CaO and $TiO_2$ yields calcium titanate through sintering, which serves to shift the value of Tf in the positive direction. The best results are obtained when CaO and $TiO_2$ are present in an equimolar amount, and better results are obtained when the molar ratio of CaO/$TiO_2$ ranges from 0.8 to 1.3. However, the present invention is not limited to such values, and may be carried out within the range as defined in the Summary of the Invention. CaO should be at least 0.5 mol % in order to be effective.

The addition of $Cr_2O_3$ and/or NiO to the ternary formulation has no substantial influence upon the values of E and tan $\delta$, and causes a linear decrease in the value of Tf with an increase in the amount thereof. This will now be explained with reference to the accompanying drawings for each additive component. FIG. 1 is a graph showing the relation between the value of Tf and the amount (parts by weight) of $Cr_2O_3$ added per 100 parts by weight of the $Al_2O_3$-CaO-$TiO_2$ ternary formulation, and FIG. 2 is a graph showing the relation between the value of Tf and amount (parts by weight) of NiO added per 100 parts by weight of the same formulation. In FIG. 1, a straight line a illustrates the relation of the value of Tf versus the amount of $Cr_2O_3$ added to a formulation consisting of, on molar basis, 92.40% $Al_2O_3$, 3.80% CaO and 3.80% $TiO_2$, and a straight line b illustrates the relation of the value of Tf versus the amount of $Cr_2O_3$ added to a formulation consisting of, on molar basis, 98.66% $Al_2O_3$, 0.67% CaO and 0.67% $TiO_2$. In FIG. 2, straight lines c and d illustrate the relations of the value of Tf versus the amount of NiO added to the aforesaid formulations, respectively. From FIGS. 1 and 2, it is noted that the value of Tf decreases linearly along with an increase in the amount of $Cr_2O_3$ or NiO added. The gradients of these lines remain unchanged, even when the amount of $Al_2O_3$ in the formulation is varied, as long as the type of the additive component is the same. This will become apparent from plotting the values of Tf given in the examples to be described later. The linear relation established between the amount of additives and the value of Tf is translated toward the negative direction along the Tf axis with an increase in the content of $Al_2O_3$. Now assuming X and Y are the amounts, expressed in terms of parts by weight, of $Cr_2O_3$ and NiO added per 100 parts by weight of the ternary $Al_2O_3$-CaO-TiO system and z is the content, expressed in terms of mol %, of $Al_2O_3$ in the formulation, then the following general Equations (1) and (2) can be deduced from FIGS. 1 and 2, respectively:

$$Tf = -\frac{100}{6} X + P \text{(when } z = \text{constant, } P = \text{constant)} \quad (1)$$

$$Tf = -40y + P \text{ (when } z = \text{constant, } P = \text{constant)} \quad (2),$$

where P stands for the Tf value in the absence of any additive. It is to be understood, in both equations, that P assumes common values while varying with z. Then, the measurement of Tf values at varied z values has indicated that between P and z there is a linear relation, as shown in FIG. 3. The resulting general Equation is:

$$P = -\frac{1060}{72} (z - 90) + 106 \quad (3)$$

While the foregoing explanation has been made to the addition of either $Cr_2O_3$ or NiO, it is appreciated that the general Equations (1)–(3) may be applied to even a combination of $Cr_2O_3$ with NiO. Now let a combination of x parts by weight of $Cr_2O_3$ with y parts by weight of NiO be added per 100 parts by weight of the ternary $Al_2O_3$-CaO-TiO$_2$ formulation. The present invention is applied to only the cases where the amounts of $Cr_2O_3$ and NiO added per 100 parts by weight of the formulation are preponderantly small. Consequently, a certain limitation is placed upon the uniformity of the distribution of the additive components in the final ceramic (porcelain) products obtained by not only the powder formulating process but also other formulation processes, so that any of $Cr_2O_3$ and NiO particles is present alone in a minute volume of the order of submicrons to several tens micrometers. Thus, no NiO particle is found in a minute volume having therein a $Cr_2O_3$ particle, whereas no $Cr_2O_3$ particle is found in one minute volume having therein a NiO particle. The concentration of $Cr_2O_3$ and NiO in the respective minute volumes are thus 2x parts by weight and 2y parts by weight per 100 parts by weight of the formulation. Where $Cr_2O_3$ and NiO are each other independently present, on the other hand, the synergetic effect on both, if any, can be neglected, and Equation (1) or (2) holds in the respective minute volumes. Hence, $$Tf^x = -\frac{100}{6} (2x) + P \quad (4)$$

holds for the minute volume having therein $Cr_2O_3$ particles, and $$Tf^x = -40(2y) + P \quad (5)$$

holds for the minute volume having therein NiO particles. Since any synergetic effect of $Cr_2O_3$ and NiO can be neglected as mentioned above, the additive property is established between Equations (4) and (5). The value of Tf of the overall ceramic composition is thus found by $$Tf = (Tf^x + Tf^y)/2 = -\frac{100}{6} x - 40y + P. \quad (6)$$

Then, substituting Equation (3) for equation (6) are cancelling P gives:

$$Tf = -\frac{100}{6} x - 40y - \frac{1060}{72} (z - 90) + 106 \quad (7)$$

In view of the practical usefullness for high-frequency dielectric ceramic articles, the range of x, y and z satisfying Tf≦30 is given by:

$$-30 \leq -\frac{100}{6} x - 40y - \frac{1060}{72} (z - 90) + 106 \leq 30 \quad (8)$$

Then, clearing of constants gives:

$$76 \leq \frac{50}{3} x + 40y = \frac{265}{18} (z - 90) \leq 136 \quad (9)$$

In Equation (9), z is the content, expressed in terms of mol %, of $Al_2O_3$ in the formulation. However, when that value exceeds 99, Equation (9) is not satisfied, even though the values of x and y are reduced as much as possible. Taking experimental errors into account and to clearly define the technical scope, the upper and lower limits of z are fixed to 98.7 and the aforesaid value, respectively. In other words, the range of z is defined in terms of $92.4 \leq z \leq 98.7$. It is a matter of course that $x \geq 0$ and $y \geq 0$ should be satisfied, since both variables indicate the amounts, expressed in terms of parts by weight, of additive components. It goes without saying that the case where $x = y = 0$ is excluded from the invention, since the absence of both additives departs from the scope of the invention.

As long as the foregoing conditions are satisfied, the alumina ceramic body of the present invention has an E value of 10 or thereabout and a tan δ value of $2 \times 10^{-4}$ or lower, and shows a practically high Tf value, as desired, without any variation in the values of E and tan δ.

It is here understood that the aforesaid combination-addition theory defined by the equations subsequent to Equation (4) is based on the assumption that the minute volume having therein the $Cr_2O_3$ particle is equal to that having therein the NiO particle. However, that assumption appears to be reasonable in view of the fact that the present invention is applied to only the cases where the amounts of $Cr_2O_3$ and NiO added per 100 parts by weight of the formulation are preponderantly small. In other words, this is because, by means that in the alumina ceramic body of the present invention, the amount of the formulation particles which have been sinter-bonded with only the other formulation particles but not sinter-bonded with any of $Cr_2O_3$ and NiO particles is much larger than that of the formulation particles sintered with merely either one of the $Cr_2O_3$ and NiO particles, it is always theoretically possible to make the foregoing two minute volumes equivalent to each other by the former formulation particles.

According to the present invention, the following embodiments are preferred. A composition where x ($Cr_2O_3$) is 0.6 to 5 parts by weight and y (NiO) is 0.2 to 2 parts by weight, each per 100 parts by weight of the ternary formulation is preferred, more preferred being a composition where x is 0.7 to 3 parts by weight and y is 0.3 to 1 parts by weight.

Particularly preferred is a range of 94-97 mol % of $Al_2O_3$ in the ternary formulation, and 0.6 to 4 parts by weight of $Cr_2O_3$ and 0.3 to 2 parts by weight of NiO where $Cr_2O_3$ and NiO are per 100 parts of the formulation, in view of achieving Tf of −15 to +15 ppm/°C. and tan δ of $1.5 \times 10^{-4}$ or less.

The Equation (9) is preferred if limited to a range from 90 (inclusive) to 120 (inclusive). The supporting data are shown in the examples, e.g., Sample Nos. 8, 9, 10, 13, 47, 48, 49, etc.

The sintering can be carried out at a temperature ranging from 1420° to 1460° C., preferably from 1430° to 1450° C. The sintering time will largely depend upon the size of the compact to be sintered, however, may range about 0.5 to several hours. The particle size of the starting powder for sintering should be as fine as possible (preferably 0.7 micrometer or less), and the purity thereof should be as high as possible (preferably 99.9 % or more), in the practical sence, respectively.

EXAMPLES

Almina (TM-5, manufactured by Taimei Kagaku, Japan), titanium dioxide (special grade reagent, 95 % or higher of rutile type) and calcium carbonate (special grade reagent) were formulated together to a total amount of 500 g to obtain the formulation compositions based on the oxide amount as specified in Tables 1 to 3. To 100 parts by weight of the formulation nickel oxide NiO (special grade reagent) or chromium oxide $Cr_2O_3$ (special grade reagent) were added in the proportions as specified in Tables 1 to 3, followed by further addition of 300 ml of pure water, 5 g of polyvinyl alcohol and 5 g of polyethylene glycol. The resulting mixture was placed with 2 kg of almina porcelain balls having a purity of 99.99 % and a diameter of 15 mm in a polyethylene ball mill having an inner volume of 2 liters for 50-hour wet mixing, thereby obtaining a slurry having an average particle size of about 0.25 micrometer. The slurry was freeze-dried, passed through a 32-mesh sieve, compacted at a pressure of 1500 kg/cm² in a metal mold, sintered at a temperature of 1440° C. in an oxidizing atmosphere finished by polishing to a surface roughness of 0.1 S on both ends and 0.3 S (according to JIS B0601) on sides, washed with acetone and then ultrasonically in water, and was dried to prepare alumina porcelain Samples Nos. 1 to 61 each measuring 15 mm diameter×8 mm thick. Under the following conditions, measurements were made of the values of Tf, tan δ and E of these samples. The results are set forth in Tables 1 to 3, and shown in FIGS. 1-3.

Measuring Conditions
Method: Dielectric Disc Resonator Method
Device: 8408B Network Analyzer System manufactured by Yokogawa Hewlett Packard Co., Ltd.
Frequency: 8.0 GHz The purities and the average particle size of the starting materials are listed in the following Table, while generally preferred values are being listed, too.

|  | Purity (%) | Average Particle Size (μm) | Generally Peferred Values Purity (%) | Average Particle Size (μm) |
|---|---|---|---|---|
| $Al_2O_3$ | 99.99 | 0.2 | >99.9 | ≦0.5 |
| $CaCO_3$ | 99.9 | 0.5 | ≧99.9 | ≦0.6 |
| $TiO_2$ | 99.9 | 0.2 | ≧99.9 | ≦0.3 |
| NiO | 99.9 | 0.5 | ≧99.9 | ≦0.5 |
| $Cr_2O_3$ | 99.9 | 0.4 | ≧99.9 | ≦0.5 |

TABLE 1

Alumina Ceramic Body Composition

| Sample No. | Formulation [mole %] $Al_2O_3$ | CaO | $TiO_2$ | $Cr_2O_3$ NiO (parts by weight) | Electric Properties $\tau_f$ [ppm/°C.] | tan δ [× 10⁻⁴] | E | Remarks |
|---|---|---|---|---|---|---|---|---|
| 1 | 95.2 | 2.4 | 2.4 |  | +30 | 1.10 | 11.6 | Comparison |
| 2 | 96.2 | 1.9 | 1.9 |  | +15 | 0.79 | 11.3 |  |
| 3 | 97.2 | 1.4 | 1.4 |  | 0 | 0.55 | 11.1 |  |
| 4 | 98.2 | 0.9 | 0.9 |  | −15 | 0.34 | 10.8 |  |
| 5 | 99.4 | 0.3 | 0.3 |  | −30 | 0.23 | 10.5 |  |
| 6 | 93.8 | 3.1 | 3.1 |  | +50 | 1.50 | 12.3 |  |
| 7 | 92.4 | 3.8 | 3.8 |  | +70 | 1.98 | 12.9 |  |

TABLE 2

Alumina Ceramic Body Composition

| Samples No. | Formulation (mol %) $Al_2O_3$ | CaO | $TiO_2$ | $Cr_2O_3$* (parts by weight) | Electric Properties $T_f$ [ppm/°C.] | tan δ [× 10⁻⁴] | E | Remarks |
|---|---|---|---|---|---|---|---|---|
| 8 | 95.2 | 2.4 | 2.4 | 0.93 | +15 | 1.07 | 11.6 | A |
| 9 | " | " | " | 1.82 | 0 | 1.07 | 11.6 | " |
| 10 | " | " | " | 2.73 | −15 | 1.06 | 11.5 | " |
| 11 | " | " | " | 3.64 | −30 | 1.06 | 11.5 | " |
| 12 | " | " | " | 3.91 | −35 | 1.05 | 11.4 | B |
| 13 | 97.2 | 1.4 | 1.4 | 0.64 | −10 | 0.54 | 11.1 | A |
| 14 | " | " | " | 1.27 | −20 | 0.53 | 11.0 | " |
| 15 | " | " | " | 1.92 | −30 | 0.52 | 10.8 | " |
| 16 | " | " | " | 2.24 | −35 | 0.51 | 10.6 | B |
| 17 | 98.0 | 1.0 | 1.0 | 0.70 | −20 | 0.38 | 10.8 | A |
| 18 | " | " | " | 1.34 | −30 | 0.37 | 10.6 | " |
| 19 | " | " | " | 1.66 | −35 | 0.36 | 10.4 | B |
| 20 | 98.66 | 0.67 | 0.67 | 0.29 | −25 | 0.28 | 10.6 | A |
| 21 | " | " | " | 0.54 | −30 | 0.27 | 10.3 | " |

TABLE 2-continued

| Samples No. | Alumina Ceramic Body Composition Formulation (mol %) | | | Cr$_2$O$_3$* (parts by weight) | Electric Properties | | | Remarks |
|---|---|---|---|---|---|---|---|---|
| | Al$_2$O$_3$ | CaO | TiO$_2$ | | T$_f$ [ppm/°C.] | tan δ [× 10$^{-4}$] | E | |
| 22 | " | " | " | 0.79 | −35 | 0.26 | 10.2 | B |
| 23 | 92.40 | 3.80 | 3.80 | 2.43 | +30 | 1.91 | 12.0 | A |
| 24 | " | " | " | 3.32 | +15 | 1.90 | 11.8 | " |
| 25 | " | " | " | 4.20 | 0 | 1.90 | 11.6 | " |
| 26 | " | " | " | 5.07 | −15 | 1.89 | 11.3 | " |
| 27 | " | " | " | 6.00 | −30 | 1.88 | 11.2 | " |
| 28 | " | " | " | 6.26 | −35 | 1.87 | 11.0 | B |
| 29 | 93.8 | 3.1 | 3.1 | 1.18 | +30 | 1.47 | 11.7 | A |
| 30 | " | " | " | 2.41 | +15 | 1.43 | 11.2 | " |
| 31 | " | " | " | 2.95 | 0 | 1.41 | 11.0 | " |
| 32 | " | " | " | 3.83 | −15 | 1.40 | 10.7 | " |
| 33 | " | " | " | 4.72 | −30 | 1.37 | 10.6 | " |
| 34 | " | " | " | 5.00 | −35 | 1.35 | 10.2 | B |

Notes:
*The amount of Cr$_2$O$_3$ is given relative to 100 parts by weight of the formulation
A: within the scope of the invention
B: outside of the scope of the invention

TABLE 3

| Samples No. | Alumina Ceramic Body Composition Formulation (mol %) | | | NiO* (parts by weight) | Electric Properties | | | Remarks |
|---|---|---|---|---|---|---|---|---|
| | Al$_2$O$_3$ | CaO | TiO$_2$ | | T$_f$ [ppm/°C.] | tan δ [× 10$^{-4}$] | E | |
| 35 | 92.4 | 3.8 | 3.8 | 1.00 | +30 | 1.97 | 12.1 | A |
| 36 | " | " | " | 1.37 | +15 | 1.96 | 11.8 | " |
| 37 | " | " | " | 1.79 | 0 | 1.96 | 11.6 | " |
| 38 | " | " | " | 2.10 | −15 | 1.95 | 11.5 | " |
| 39 | " | " | " | 2.46 | −30 | 1.93 | 11.2 | " |
| 40 | " | " | " | 2.58 | −35 | 1.93 | 11.1 | B |
| 41 | 93.8 | 3.1 | 3.1 | 0.53 | +30 | 1.47 | 11.75 | A |
| 42 | " | " | " | 0.91 | +15 | 1.46 | 11.6 | " |
| 43 | " | " | " | 1.28 | 0 | 1.44 | 11.4 | " |
| 44 | " | " | " | 1.65 | −15 | 1.41 | 11.4 | " |
| 45 | " | " | " | 2.01 | −30 | 1.40 | 11.3 | " |
| 46 | " | " | " | 2.13 | −35 | 1.38 | 11.2 | B |
| 47 | 95.2 | 2.4 | 2.4 | 0.40 | +15 | 1.08 | 11.5 | A |
| 48 | " | " | " | 0.75 | 0 | 1.06 | 11.4 | " |
| 49 | " | " | " | 1.10 | −15 | 1.05 | 11.2 | " |
| 50 | " | " | " | 1.45 | −30 | 1.03 | 11.2 | " |
| 51 | " | " | " | 1.58 | −35 | 1.02 | 11.1 | B |
| 52 | 97.2 | 1.4 | 1.4 | 0.24 | −10 | 0.54 | 11.0 | A |
| 53 | " | " | " | 0.48 | −20 | 0.53 | 10.8 | " |
| 54 | " | " | " | 0.72 | −30 | 0.53 | 10.7 | " |
| 55 | " | " | " | 0.84 | −35 | 0.55 | 10.6 | B |
| 56 | 98.0 | 1.0 | 1.0 | 0.23 | −20 | 0.39 | 10.9 | A |
| 57 | " | " | " | 0.47 | −30 | 0.38 | 10.8 | " |
| 58 | " | " | " | 0.56 | −35 | 0.37 | 10.7 | B |
| 59 | 98.66 | 0.67 | 0.67 | 0.14 | −25 | 0.27 | 10.6 | A |
| 60 | " | " | " | 0.28 | −30 | 0.26 | 10.5 | " |
| 61 | " | " | " | 0.42 | −35 | 0.26 | 10.3 | B |

Notes:
*The amount of NiO is given relative to 100 parts by weight of the formulation
A: within the scope of the invention
B: outside of the scope of the invention As will be noted from Table 1, the alumina porcelain samples to which no additive component Cr$_2$O$_3$ or NiO was added showed a large tan δ variation with a T$_f$ change. As will be understood from Tables 2 and 3, however, the alumina ceramic products to which Cr$_2$O$_3$ or NiO was added remained unchanged in tan δ, and showed a T$_f$ value that decreased linearly along with an increase in the amount of Cr$_2$O$_3$ or NiO.

As mentioned in the foregoing, the present invention can provide a desired dielectric ceramic body showing a limited or reduced high-frequency dielectric loss and having stable temperature proeprties.

It should be noted that modifications may be made within the concept of the present invention hereinabove disclosed and within the scope as claimed hereinbelow without departing therefrom. The exemplified embodiments should not be construed to be merely limitative thereto.

We claim:
1. An alumina ceramic body obtained by sintering a composition consisting essentially of:
   100 parts by weight of a ternary formulation consisting of 92.4 to 98.7 mol% Al$_2$O$_3$, and 1.3 to 7.6 mol% in total of CaO and TiO$_2$, provided that the CaO is at least 0.5 mol%; and
   at least one selected from the group consisting of Cr$_2$O$_3$ and NiO subject to the relation of:

$$76 \leq \frac{50}{3} x + 40y + \frac{265}{18} < (z - 90) \leq 136$$

where x is the weight part of $Cr_2O_3$ per 100 parts by weight of said formulation, y is the weight part of NiO per 100 parts by weight of said formulation, and z is the mol% of $Al_2O_3$ in the formulation.

2. The alumina ceramic body as defined in claim 1, wherein x is 0.6 to 5 parts by weight, and y is 0.2 to 2 parts by weight.

3. The alumina ceramic body as defined in claim 2, wherein x is 0.7 to 3 parts by weight, and y is 0.3 to 1 parts by weight.

4. The alumina ceramic body as defined in claim 1, wherein said relation is:

$$90 \leq \frac{50}{3} x + 40y + \frac{265}{18} (z - 90) \leq 120.$$

5. The alumina ceramic body as defined in claim 1, wherein the molar ratio of CaO to $TiO_2$ ($CaO/TiO_2$) is 0.8 to 1.3.

6. The alumina ceramic body as defined in claim 5, wherein the molar ratio of CaO to $TiO_2$ is about one.

* * * * *